United States Patent [19]

Walker

[11] Patent Number: 4,803,434

[45] Date of Patent: Feb. 7, 1989

[54] TEST DEVICE FOR CIRCUIT BREAKERS HAVING ELECTRONIC TRIP UNITS

[75] Inventor: Christopher G. Walker, Coraopolis, Pa.

[73] Assignee: Westinghouse Electric Corp., Pittsburgh, Pa.

[21] Appl. No.: 169,929

[22] Filed: Mar. 18, 1988

[51] Int. Cl.$^4$ ............... G01R 31/02; G01R 31/32
[52] U.S. Cl. ........................ 324/424; 324/415; 340/638; 340/639
[58] Field of Search .............. 324/415, 424, 550; 340/638, 639; 361/42, 102

[56] References Cited

U.S. PATENT DOCUMENTS

| | | | |
|---|---|---|---|
| 3,532,967 | 10/1970 | Milton | 324/28 |
| 3,740,738 | 6/1973 | Kosanovich et al. | 340/638 |
| 3,745,453 | 7/1973 | Wright | 324/51 |
| 3,924,160 | 12/1975 | Maier | 317/36 |
| 4,128,804 | 12/1978 | Russell | 324/28 |
| 4,193,025 | 3/1980 | Frailing | 324/427 |
| 4,611,174 | 9/1986 | Arnoux | 324/424 |
| 4,634,981 | 1/1987 | Shimp | 324/424 |

FOREIGN PATENT DOCUMENTS 2618295 11/1977 Fed. Rep. of Germany .
54-108248 8/1979 Japan .

*Primary Examiner*—Reinhard J. Eisenzopf
*Assistant Examiner*—Maura K. Regan
*Attorney, Agent, or Firm*—M. J. Moran

[57] ABSTRACT

The invention is directed to a portable test device for an electronic trip unit which is electrically powered from the internal power supply of the trip unit being tested. The test unit utilizes three leads connected to the trip unit. One of the leads connects to the voltage source for the trip unit and another lead connects to the ground potential to acquire power from the test unit. The voltage is selectively adjusted within the test unit by resistors and a potentiometer to vary the input voltage which is to be carried by the third lead into the trip unit.

6 Claims, 2 Drawing Sheets

TEST DEVICE FOR CIRCUIT BREAKERS HAVING ELECTRONIC TRIP UNITS

CROSS-REFERENCE TO RELATED APPLICATIONS

Reference is made to copending application of W. J. Murphy, Ser. No. 888,306, filed July 22, 1986 now U.S. Pat. No. 4,743,875 and W. J. Murphy et al., Ser. No. 891,018, filed July 31, 1986 now abandoned and both assigned to the assignee of this application.

TECHNICAL FIELD

This invention relates to a portable test device for an electronic trip unit and, more particularly, to an internally powered test device for an electronic unit.

BACKGROUND OF THE INVENTION

From time to time, it is necessary to test circuit breakers to verify that they will actually trip at proper current values and with proper time delay. Manifestly, it is desirable that a circuit breaker trip at appropriate current values and with proper time delay to prevent or minimize damage to a device protected by the breaker and upon occurrence of an overcurrent condition.

Circuit breakers having solid state trip units usually depend upon a low power current source by which one of a number of preset values of current are injected into the trip circuit to simulate, for testing, an overcurrent condition. Testing of solid state trip circuits of a circuit breaker in this manner is advantageous in that it is not necessary to connect or disconnect energized conductors to the circuit breaker.

Associated with the testing procedure is a requirement of testing in the field where the circuit breakers are located. Heretofore, one type of test device has been a portable test unit that is powered by an external 120 AC power source which currently exists on the market. A disadvantage of such a test unit is that it is costly, bulky, and requires modification for the DC electronic trip unit. Accordingly, a need exists for a test device which is dependent only upon an internal power supply of the electronic trip unit being tested, whereby no additional power source is required to be connected to the test device.

SUMMARY OF THE INVENTION

It has been found in accordance with this invention that in an electrical system having current conductors a circuit interrupter may be provided which is connected to the current conductors and includes an electronic trip device having solid state components; a current sensor on at least one of the conductors and having leads extending to the solid state components; a source of power for the electronic trip units; an electronic test unit for monitoring the trip unit characteristics and having first, second, and third circuits; the first circuit extending from one lead of the current sensor to a ground potential and including a first switch, a light-emitting diode, and a current-limiting resistor; the second circuit extending from one of the leads of the current sensor to an input test signal conductor and including the first switch, a first resistance, a potentiometer, and a second switch, the first resistance setting the lower limit of adjustability of the potentiometer; the third circuit extending from the input test signal conductor to the ground potential and including the second switch, the potentiometer, a second resistance, and the second resistance setting the upper limit of adaptability of the potentiometer; and the trip unit being powered by the source of power, whereby the test unit is internally powered by the source of power for the trip unit.

The advantage of the device of this invention is that there is provided a portable test unit for an electronic trip unit which test unit is electrically powered from the internal power supply of the electronic trip unit being tested, so that no additional power source is required for testing trip units in the field.

DESCRIPTION OF THE PREFERRED EMBODIMENTS

Figure 1:
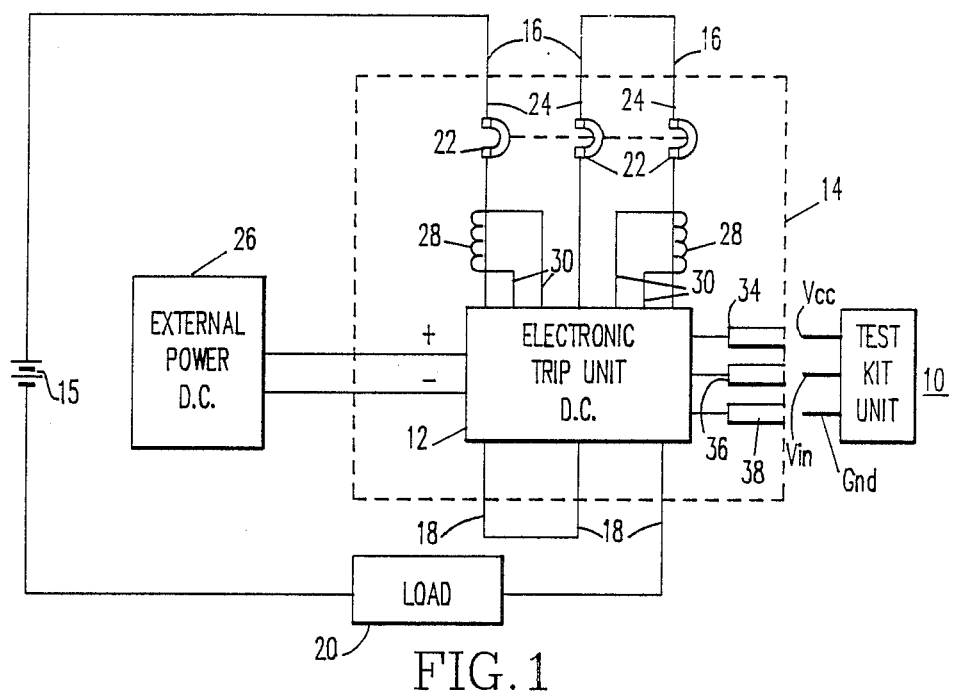
FIG. 1 is a diagrammatic view of a circuit breaker having an electronic trip unit with an electronic test unit attached accordance with this invention.

In FIG. 1 an electronic test unit is generally indicated at 10 and is disposed in a detached position from an electronic trip unit 12 which is an integral part of a circuit breaker or interrupter 14.

For testing the circuit breaker 14, a low voltage direct current source 15, such as 600 volts, is provided across the line and load terminals 16, 18 for providing a current source to a load 20. The circuit interrupter 14 is a circuit breaker having operable contacts 22 disposed in conductors 24 extending between the several terminals 16, 18.

The electronic trip unit 12 is shown in block diagram form and is comprised of solid state components. The trip unit 12 is powered by a control power source 26 of, for example, 24 volts, in accordance with the direct current status of the trip unit 12. In the alternative, the control power source 26 may be of an alternating current source. One or more current sensors 28 for monitoring the conductors 24 are provided with leads 30 extending to the solid state components of the trip unit 12.

Figure 2:
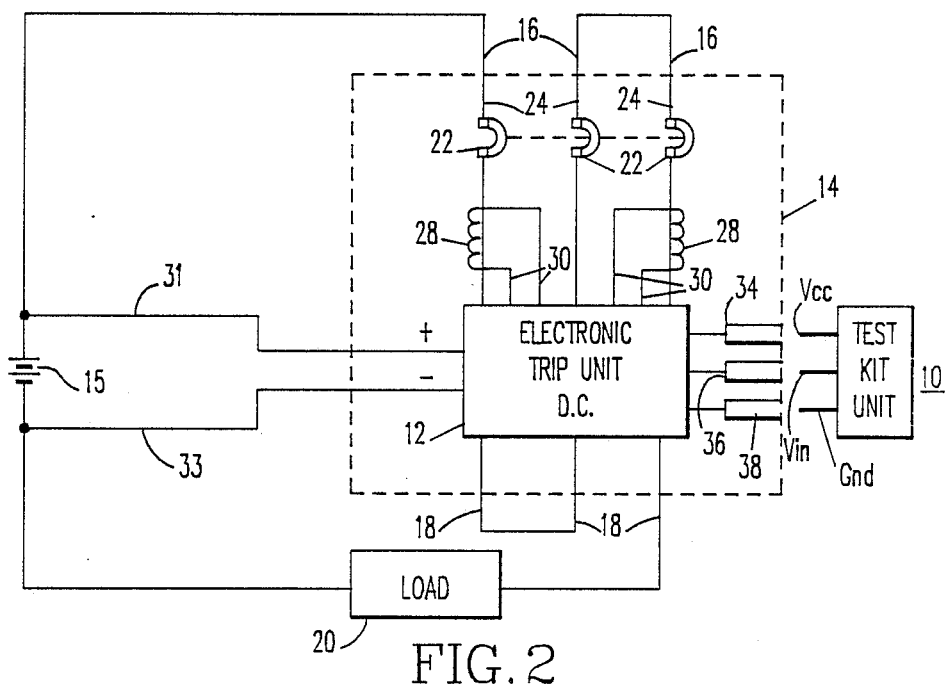
FIG. 2 a diagrammatic view of another embodiment of the invention.

In another embodiment of the invention, as shown in FIG. 2, the separate control power source 26 may be omitted in favor of the power source, such as the direct current source 15, which powers the load 20. For that, purpose, leads 31, 33 extend from the electronic trip unit 12 to the conductors of the direct current as shown in FIG. 2.

Figure 3:
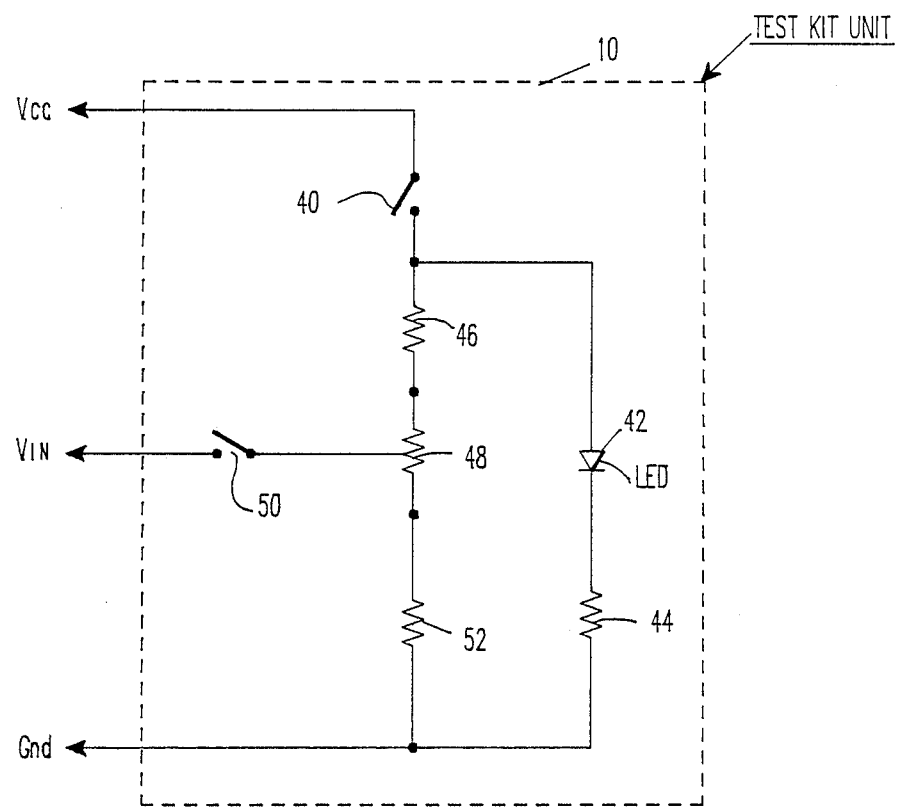
FIG. 3 is a circuit diagram of the electronic test unit.

In accordance with this invention, the test device 10 is disclosed schematically in FIG. 3. Although the test unit 10 may be permanently attached to the trip unit 12, it is preferably detachably disposed and is provided with terminal pins or terminals $V_{cc}$, $V_{in}$, and $G_{nd}$ which are plugged through corresponding terminal sockets, or receptacle connectors 34, 36, 38 which are appropriate voltage source, ground potential, and input test signals, respectively, of the electronic trip unit 12. Thus, the test unit 10 is electrically powered from the internal power supply of the electronic trip unit 12 which is being tested. As a consequence, no additional power source is required to be connected to the test unit 10.

At first circuit, extending from the $V_{cc}$ terminal to the $G_{nd}$ terminal, includes a first switch 40, a light emitting diode (LED) 42, and a current-limiting resistor 44.

A second circuit, extending from the $V_{cc}$ terminal to the $V_{in}$ terminal, includes the switch 40, a resistance 46, a potentiometer 48, and a second switch 50.

A third circuit, extending from the $V_{in}$ terminal to the $G_{nd}$ terminal includes the second switch 50, the potentiometer 48, and a resistance 52.

When the first switch 40 is closed, the LED 42 turns on with current flowing through the current limiting resistor 44. In addition, a voltage potential is developed between the wiper arm of the potentiometer 48 and the ground terminal $G_{nd}$.

When the second switch 50 is closed, a voltage is then available as an input test signal through the terminal $V_{in}$ to the trip unit 12 to which the input test signal conductor is connected. If the first and second switches 40, 50 are identical sections of a two-pole switch, the foregoing sequence of events, including the operation of the LED 42 and voltage developed at the terminal $V_{in}$, occur simultaneously. By adjusting the set point of the potentiometer 48, the magnitude of the input test signal at $V_{in}$ may be either preselected before the switch contacts are closed, or may be increased or decreased while the input signal is being applied. The position of the set point is easily tracked by the calibration marks on the potentiometer itself, or on an appropriate name plate dial.

As a result, the input test voltage $V_{in}$ may be adjusted between any selected maximum or minimum limits by the values chosen for the resistors 46, 52 and the potentiometer 48. The minimum limit is 1.5 per unit, and is set by the resistance 52. The maximum limit is 5.0 per unit and is set by the resistance 46. The potentiometer 48 allows for adjustment to any per unit value between the maximum and minimum limits.

The LED 42 serves as a visual indicator that power is applied to the test unit 10, and that an output test signal is being fed into the trip unit 12.

Where the electronic trip unit 12 is powered from a direct current source, the current sensors 28 are similarly powered in order to provide trip intelligence for the trip unit. The DC control power for the trip unit 12 may be applied either externally, such as from a DC control power source 26 (FIG. 1), or taken from the current bus (FIG. 2).

The electronic trip unit 12 includes circuits from long delay or overload currents as well as instantaneous trips and circuits for overvoltage and undervoltage protection. The trip unit 12 also operates independently from either one or both of the sensors 28 which send the magnitude value of the existing breaker current to both overload and instantaneous circuits.

In operation, the test unit 10 simulates the intelligence that the current sensors would normally provide during normal operation. The test unit 10 also operates on the power in the trip unit 12. As shown in FIG. 1, power is fed to the test unit through the terminals s $V_{cc}$ and $G_{nd}$. $V_{cc}$ is tied to the 10 volt DC power supply in the trip unit. The input signal to the trip unit that simulates the input intelligence from the current sensor 28 is supplied through the terminal $V_{in}$. As soon as the test unit 10 is plugged into the trip unit 12 and the ten volt power is established, the LED 42 is illuminated to indicate that the trip unit is ready for testing. Inputs to the trip unit 12 can then be preselected by adjustments of the potentiometer 48. Simulated input is then applied to the trip unit by closing switch 50.

Thus, the trip unit 22 responds to the input voltage and trips in a time dependent on the combination of the input current selected on the test unit 10 and the settings of the trip unit 22. This results in tripping of the breaker.

The purpose of the resistances 46, 52 is to select the maximum and minimum trip limits for the trip unit. Thus, the potentiometer 48 is adjustable between the limits established by the resistances.

In accordance with this invention, there is provided a portable test device for an electronic trip unit which is normally tested in the field. Although a portable test unit that is powered by an external 120 AC power source is usable, it is bulky and costly and requires modification for the DC electronic trip unit. Accordingly, the test unit of this invention is an improvement any suitable substitute for the prior art portable test units.

What is claimed is:

1. An electrical system for power distribution with current conductors, comprising:
    a circuit interrupter connected to the current conductors and including an electronic trip unit having solid state components;
    a current sensor on at least one of the conductors and having leads extending to the solid state components;
    a source of power for the electronic trip unit;
    an electronic test unit for monitoring the trip unit characteristics and having first, second, and third circuits;
    the first circuit extending from one lead of the current sensor to a ground potential and including a first switch, a light-emitting diode, and a current limiting resistor;
    the second circuit extending from one lead of the current sensor to an input test signal conductor and including the first switch, a first resistance, a potentiometer, and a second switch, the first resistance setting the lower limit of adjustability of the potentiometer;
    the third circuit extending from the input test signal conductor to the ground potential and including the second switch, the potentiometer, a second resistance, and the second resistance setting the upper limit of adjustability of the potentiometer; whereby the test unit is internally powered by the source of power for the trip unit.

2. The device of claim 1 in which the current conductors and the source of power conduct direct current.

3. The device of claim 2 in which the test unit is detachably mounted on the trip unit.

4. The device of claim 3 in which the first, second and third circuits comprise terminals that are detachably engaged with corresponding terminals of the current sensor and solid state components.

5. The device of claim 4 in which the trip unit is powered by one of the current conductors and the source of power.

6. The device of claim 5 in which the trip unit is powered by the source of power.

* * * * *